United States Patent [19]

Robbins, Jr.

[11] Patent Number: 4,658,805

[45] Date of Patent: Apr. 21, 1987

[54] THERMO-HYDRAULIC POWER SUPPLY

[76] Inventor: Roland W. Robbins, Jr., 751 S. Richmond Rd., Ridgecrest, Calif. 93555

[21] Appl. No.: 649,424

[22] Filed: Dec. 3, 1984

[51] Int. Cl.$^4$ .................................................. F24J 3/02
[52] U.S. Cl. .................................. 126/425; 250/203 R; 353/3; 60/531; 60/528; 60/641.8
[58] Field of Search .................. 126/425; 60/528, 530, 60/531, 641.8; 353/3; 250/203 R

[56] References Cited

U.S. PATENT DOCUMENTS

| Re. 30,961 | 1/1982 | Robbins | 126/425 |
|---|---|---|---|
| 4,016,722 | 4/1977 | Niederer, Sr. | 60/530 |
| 4,031,385 | 6/1977 | Zerlaut et al. | 126/425 |
| 4,082,947 | 4/1978 | Haywood et al. | 126/425 |
| 4,274,394 | 6/1981 | Stromberg | 126/425 |
| 4,306,541 | 12/1981 | Morrison et al. | 126/425 |
| 4,351,319 | 9/1982 | Robbins, Jr. | 126/425 |
| 4,396,006 | 8/1983 | Cross, Jr. | 126/425 |

FOREIGN PATENT DOCUMENTS 48302  2/1983  Japan .................................. 126/425

Primary Examiner—Allen M. Ostrager
Attorney, Agent, or Firm—Baker & Houston

[57] ABSTRACT

A radiant energy utilization device including an aiming detector sensing the relative angle of radiation received and outputting signals in accordance therewith to control aiming of the device or portions thereof or for other purposes.

3 Claims, 1 Drawing Figure

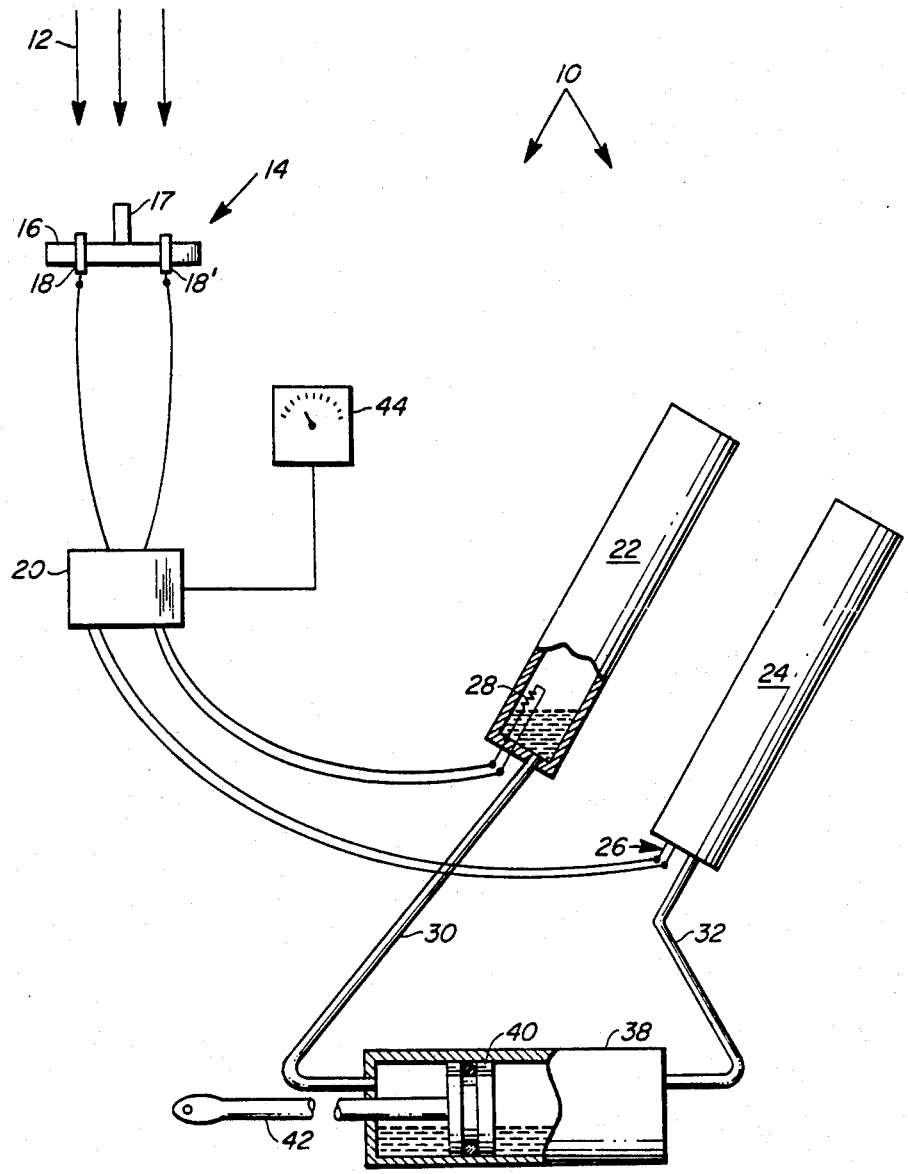

THERMO-HYDRAULIC POWER SUPPLY

SUMMARY OF THE INVENTION

This invention relates to a radiant energy utilization device for exploiting solar radiation, for example, to do work. The device includes aiming error detector units mounted either stationary with respect to the earth or on movable platforms mounted for movement in a predetermined manner.

A signal conditioner and amplifier is used to receive signals from the detectors in accordance with the direction in which the radiation is being received thereby. The signal conditioner may also receive signals from other devices such as a command station which may be set manually to modify the actions of the utilization device as desired. Output of the signal conditioner goes to one of two evaporator/condenser tubes in the form of electrical current which is supplied to a heater in the tube.

Each evaporator/condenser unit comprises a tube filled with a fluid having a liquid and a vapor phase and with a portion of the tube comprising an ullage having a vapor only. When one of the tubes is heated by current from the signal conditioner and supplier, a rise in vapor pressure will be created in that tube.

When a pressure rise is created in one tube and no corresponding pressure rise occurs in the other, fluid flows from the tube with higher pressure to one side of a free piston in a hydraulic actuator. The movement of the actuator, in turn, may be utilized to do work, for example, in the moving of solar panels, solar collector arrays or simply to open or close curtains in the home, office or laboratory.

BRIEF DESCRIPTION OF THE DRAWING

The single FIGURE of the drawing is a schematic illustration of a preferred embodiment according to the invention with some parts broken away and sectioned for clarity.

DETAILED DESCRIPTION

The radiant energy device shown on the drawing and designated generally as 10, is a preferred embodiment of the invention. Radiant energy 12, such as the rays of the sun, are shown travelling directly toward an aiming error detector unit 14 which comprises a sensor platform 16 with a shadow bar 17 attached thereto orthoganal to the surface of the platform. Attached to the platform 16 are at least two or more photoelectric devices 18, 18', etc. These devices, in the preferred embodiment shown are photovoltaic and, when receiving radiation, supply current to a signal conditioning and amplifying device 20. The amplitude of the signal will depend upon the amount of radiation striking the particular device.

The signal conditioning device 20 responds to signals from the devices 18, 18', etc. and transmits amplified signals in accordance therewith to one or more evaporator/condenser tubes 22, 24. Additional power may be derived from a PV panel eg. In the preferred embodiment, one signal only is transmitted from any pair to correspond with the greater signal from the one photoelectric device receiving the greater radiation. The evaporator/condenser tubes are thermally insulated and are filled with a fluid having a gaseous phase and a liquid phase within the tubes and the gaseous phase is one which shows a substantial increase in saturation pressure as a function of temperature increase and has a saturation pressure at a reasonably low level over the operative temperature range. The operative fluid in a preferred embodiment is Freon.

Electric heating coils 26, 28 are placed in the respective tubes along with fluid conduits 30, 32 and the tubes are hermetically sealed. The conduits 30, 32 from the respective tubes connect one or the other fluid chambers of a hydraulic motor 38 having a central piston 40 connected to a piston rod 42 extending from one end of motor 38.

When one of the photoelectric devices on platform 16 receives more radiation than the other, the signal conditioner 20 detects a greater signal from one of the devices, that signal is amplified to the exclusion of the other and the corresponding evaporator/condenser is subjected to heat, thus creating pressure on the corresponding side of motor 38.

A command Station 44 is shown connected to the signal conditioning device 20 and may be set to modify the action of the utlization device as desired.

A preferred embodiment of the invention has been utilized in a sun tracking system to continuously aim a solar utilization device directly toward the sum.

The aiming error detector of the system utilizes two photoelectric cells and a shadow bar arranged in such a fashion as to be able to detect when the sun is off boresight to the particular array that the error detector is attached to.

If an aiming error exists, the aiming error detector sends an appropriate electric signal to the amplifier which in turn determines in which direction the error is and the magnitude of the error. From this information the amplifier applies a voltage to one or the other of the heating elements attached to the evaporator tubes.

Each evaporator tube contains a mixture of Freon and oil. When a particular heating element is actuated it warms the oil and Freon mixture thereby raising the vapor pressure of the Freon with the tube. The elevated pressure is communicated to one side or the other of the piston within the double-acting actuator through the oil medium. This results in a force bias across the piston which causes the piston to move in the direction of the force bias.

The double acting actuator is connected to the movable array upon which the error detector is mounted. Any motion of the piston caused by the above events will cause the array to move in such a manner as to null out the original aiming error.

Ideally the magnitude of the aiming error signal is proportional to the magnitude of the aiming error. This will permit the array to move rapidly when large errors exist and to slow down as the error approaches zero thereby minimizing or preventing any overshoot. The oil medium within the evaporator/condenser tubes and the actuator provides a high amount of damping which tends to eliminate oscillations in the array.

The major difference of this system over existing electric drive sun tracking systems is in the substitution of the relatively inexpensive and durable evaporator/condenser and actuator in place of a relatively expensive and less reliable electric motor and speed-reducing gear box.

Some of the features of the thermoelectric sun tracking system are as follows:

1. All components are state-of-the-art and proven reliability.

2. Positioning of the drive actuator is extremely accurate.

3. Positioning of the actuator can be achieved with extremely low levels of electric power. One or two watts of input power to the evaporator/condenser tubes will cause the actuator to move. This is not possible when using an electric motor driven system in that a much higher level of power is required simply to start the motor turning.

4. The thermoelectric system has the unique feature of developing an ever increasing drive force level as a function of the length of time that power is applied to the heaters even though the level of power is not increased. This is because the temperature within the evaporator/condenser continues to increase thereby creating increasingly higher vapor pressures even though the power level applied to the evaporator/condenser is at a constant low level. In electric motor drive systems if additional drive force is desired then higher levels of electric power must be applied to the motor in proportion to the force level desired.

5. Even using an actuator of modest size, drive force levels on the order of several hundred pounds can readily be achieved.

I claim:

1. A radiant energy utilization device for the exploitation of solar energy, for example, comprising:
   a platform having an exposed surface facing the general direction of the source of radiant energy;
   at least one pair of energy detectors mounted in spaced relation to each other on said surface and designed to output an electrical signal of an amplitude proportional to the amount of radiation received;
   a shadow bar orthogonally mounted on said surface between each pair of said detectors such that both detectors of a pair receive equal radiation only when the said radiation is impinging directly orthogonally on said surface;
   detector/amplifier means receiving signals from each said energy detector and capable of discriminating between amplitudes to amplify and output only signals from the one energy detector of each pair which is receiving the greatest radiant energy;
   at least one pair of energy transducers each including heat producing means receiving said output from said detector amplifier means and transforming said output from said one energy detector to a force usable to effect mechanical movement;
   said energy transducers each comprising a fluid containing reservoir wherein a vapor pressure is created when the fluid in said reservoir is subjected to heat from said included heat producing means.

2. A device according to claim 1 wherein said platform is mounted on a structure movable in a certain manner for following the movement of the radiant energy source.

3. A device according to claim 2 wherein said energy transducers are hydraulically connected each to an opposite end of a free piston hydraulic motor.

* * * * *